United States Patent
Saiki et al.

(10) Patent No.: US 10,369,965 B2
(45) Date of Patent: Aug. 6, 2019

(54) ELECTRONIC KEY SYSTEM, ON-BOARD DEVICE, AND ELECTRONIC KEY

(71) Applicant: DENSO CORPORATION, Kariya, Aichi-pref. (JP)

(72) Inventors: Takashi Saiki, Kariya (JP); Ryusuke Ishikawa, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/068,918

(22) PCT Filed: Dec. 16, 2016

(86) PCT No.: PCT/JP2016/087499
§ 371 (c)(1),
(2) Date: Jul. 10, 2018

(87) PCT Pub. No.: WO2017/122493
PCT Pub. Date: Jul. 20, 2017

(65) Prior Publication Data
US 2019/0016302 A1  Jan. 17, 2019

(30) Foreign Application Priority Data
Jan. 14, 2016  (JP) ................. 2016-005471

(51) Int. Cl.
*B60R 25/24* (2013.01)
*G08C 17/02* (2006.01)
(Continued)

(52) U.S. Cl.
CPC .......... *B60R 25/24* (2013.01); *G07C 9/00309* (2013.01); *G08C 17/02* (2013.01);
(Continued)

(58) Field of Classification Search
CPC ................. B60R 25/24; G08C 17/02
(Continued)

(56) References Cited

U.S. PATENT DOCUMENTS

| 6,101,428 A * | 8/2000 | Snyder .................. B60R 25/245 340/425.5 |
| 2006/0267407 A1* | 11/2006 | Nagaoka ................. B60R 25/24 307/10.1 |
| 2017/0272907 A1* | 9/2017 | Godet ................ G07C 9/00309 |

FOREIGN PATENT DOCUMENTS

| JP | 2010185186 A | 8/2010 |
| JP | 2011052506 A | 3/2011 |

(Continued)

*Primary Examiner* — Vernal U Brown
(74) *Attorney, Agent, or Firm* — Harness, Dickey & Pierce, P.L.C.

(57) ABSTRACT

An electronic key system includes an on-board device and an electronic key for wireless communication. The on-board device includes: a pattern determining unit sequentially changes and determines a variation pattern of the electromagnetic wave intensity of a measurement signal; a request signal generating unit generating a request signal to which the measurement signal is added; and an LF transmitter sequentially transmitting the request signal so that the variation pattern of the electromagnetic wave intensity of the measurement signal in the request signal is changed by the pattern determining unit. The electronic key includes: an LF receiver receiving the request signal; a measurement unit sequentially measuring the variation pattern; and a key transmitter transmitting a response signal to the on-board device. The on-board device further includes: an on-board device receiver receiving the response signal; and a verifying section establishing verification of the electronic key.

13 Claims, 9 Drawing Sheets

(51) Int. Cl.
  *G07C 9/00*      (2006.01)
  *E05B 81/54*     (2014.01)
(52) U.S. Cl.
  CPC ........ *E05B 81/54* (2013.01); *G07C 2009/005* (2013.01); *G07C 2209/63* (2013.01)
(58) Field of Classification Search
  USPC .......................................................... 340/5.1
  See application file for complete search history.

(56)         References Cited

FOREIGN PATENT DOCUMENTS

JP      2014046712 A     3/2014
JP      2016035133 A     3/2016

\* cited by examiner

FIG. 11

TRANSMISSION PATTERN TA

|     | Sd  | Si1 | Si2 | Si3 | Si4 |
|-----|-----|-----|-----|-----|-----|
| TA1 | 12a | 12a | 12c | 12e | 12f |
| TA2 | 12b | 12b | 12d | 12e | 12f |
| TA3 | 12c | 12c | 12a | 12e | 12f |
| TA4 | 12d | 12d | 12b | 12e | 12f |
| TA5 | 12e | 12e | 12d | 12c | 12f |

FIG. 12

TRANSMISSION PATTERN TB

|     | Sd  | Si1 | Si2 | Si3 | Si4 |
|-----|-----|-----|-----|-----|-----|
| TB1 | 12a | 12f | 12a | 12c | 12e |
| TB2 | 12b | 12f | 12b | 12d | 12e |
| TB3 | 12c | 12f | 12c | 12a | 12e |
| TB4 | 12d | 12f | 12d | 12b | 12e |
| TB5 | 12e | 12f | 12e | 12d | 12c | ured to receive the response signal; and a verifying section
ELECTRONIC KEY SYSTEM, ON-BOARD DEVICE, AND ELECTRONIC KEY

CROSS REFERENCE TO RELATED APPLICATIONS

This application is a U.S. National Phase Application under 35 U.S.C. 371 of International Application No. PCT/JP2016/087499 filed on Dec. 16, 2016 and published in Japanese as WO 2017/122493 A1 on Jul. 20, 2017. This application is based on and claims the benefit of priority from Japanese Patent Application No. 2016-005471 filed on Jan. 14, 2016. The entire disclosures of all of the above applications are incorporated herein by reference.

TECHNICAL FIELD

The present disclosure relates to an electronic key system, wherein an on-board device used in a vehicle verifies an electronic key carried by a user by wireless communication between the on-board device and the electronic key, and to the on-board device and electronic key of the electronic key system.

BACKGROUND ART

Electronic key systems have hitherto been known, wherein wireless communication takes place between an electronic key carried by a user and an on-board device used in a vehicle to unlock a vehicle door. In such an electronic key system, the on-board device transmits a request signal to the electronic key, and the electronic key that has received the request signal transmits a response signal to the on-board device to communicate with each other, whereby the electronic key is verified. Normally, the communication is established only when the electronic key is present within a range where the electronic key can receive the request signal transmitted by the on-board device, whereupon the electronic key is verified and the vehicle door can be unlocked.

However, by establishing communication between the on-board device and the electronic key via a repeater that can relay the request signal and the response signal, a third person can unlock the vehicle door contrary to the user's intention. Such a technique of unlocking the vehicle door using a repeater is generally referred to as a relay attack.

Patent Literature 1, for example, discloses a method of preventing relay attacks, wherein a relay attack is detected using the fact that repeaters transmit relayed signals with a constant signal strength. With this method, when the on-board device transmits a request signal, the on-board device changes the signal strength with a fixed pattern. When the electronic key receives the request signal and determines that the strength of the request signal changes with this fixed pattern, the key transmits a response signal. In a relay attack by using a repeater, the repeater transmits the request signal with a constant signal strength. Accordingly, the request signal received by the electronic key has a constant signal strength, and a pattern of the signal strength does not change. Therefore, the electronic key does not transmit the response signal, and verification fails.

PRIOR ART LITERATURES

Patent Literature

Patent Literature 1: JP 2010-185186 A

SUMMARY OF INVENTION

With the method disclosed in Patent Literature 1, the on-board device sequentially transmits request signals with a variation pattern of signal strength, but the pattern is fixed and always the same. Thus, the present inventors have found the problem that the request signal transmitted by the on-board device can be reproduced by reading the variation pattern of strength of the sequentially transmitted request signals, and by transmitting the request signal from a repeater with the strength of the request signal changed in accordance with the read variation pattern of strength. The present inventors have also discovered the problem that the possible reproduction of the request signal transmitted from the on-board device can cause the electronic key to transmit the response signal that enables verification of the electronic key.

An object of the present disclosure is to provide an electronic key system that makes request signals transmitted by an on-board device hardly reproducible with a repeater used in relay attacks, and to provide the on-board device and electronic key of this electronic key system.

An electronic key system according to a first aspect of the present disclosure includes: an on-board device, which is configured to be used in a vehicle; and an electronic key, which is configured to communicate wirelessly with the on-board device. The on-board device includes: a pattern determining section configured to sequentially change and determine a variation pattern of electromagnetic wave intensity of a measurement signal, which is transmitted with a variation in the electromagnetic wave intensity; a request signal generating section configured to generate a request signal including the measurement signal added to the request signal; and an LF transmitter, which is configured to sequentially transmit the request signal generated by the request signal generating section such that, in response to the electronic key receiving the request signal, the electromagnetic wave intensity of the measurement signal included in the request signal received by the electronic key changes with the variation pattern as determined by the pattern determining section. Moreover, the electronic key includes: an LF receiver configured to receive the request signal; a measurement unit configured to sequentially measure the variation pattern of the electromagnetic wave intensity of the measurement signal included in the request signal received by the LF receiver; and a key transmitter configured to transmit a response signal to the on-board device according to the request signal, in response to a reception of the request signal by the LF receiver and a measurement of the variation pattern by the measurement unit. Furthermore, the on-board device further includes: an on-board device receiver configured to establish verification of the electronic key, based on a reception of the response signal by the on-board device receiver and a determination based on the response signal in response to the variation pattern measured by the measurement unit matching the variation pattern determined by the pattern determining section.

An on-board device related to a second aspect of the present disclosure is configured to be used in a vehicle and to communicate wirelessly with an electronic key. The on-board device includes: a pattern determining section that is configured to sequentially change and determine a variation pattern of electromagnetic wave intensity of a measurement signal, which is transmitted with a variation in the electromagnetic wave intensity; a request signal generating section that is configured to generate a request signal including the measurement signal added to the request signal; an LF transmitter that is configured to sequentially transmit the request signal generated by the request signal generating section such that, in response to the electronic key communicating wirelessly with the on-board device to receive the request signal, the electromagnetic wave intensity of the measurement signal included in the request signal received by the electronic key changes with the variation pattern as determined by the pattern determining section; an on-board device receiver that is configured to receive a response signal transmitted by the electronic key, in response to the electronic key receiving the request signal and measuring the variation pattern of the electromagnetic wave intensity of the measurement signal included in the request signal; and a verifying section that is configured to establish verification of the electronic key based on a reception of the response signal by the on-board device receiver and a determination based on the response signal in response to the variation pattern measured by the electronic key matching the variation pattern determined by the pattern determining section.

An electronic key related to a third aspect of the present disclosure is configured to communicate wirelessly with an on-board device used in a vehicle. The electronic key includes: an LF receiver that is configured to receive a request signal, which is transmitted by the on-board device, with a measurement signal for measurement of electromagnetic wave intensity; a measurement unit that is configured to sequentially measure a variation pattern of the electromagnetic wave intensity of the measurement signal included in the request signal received by the LF receiver; and a key transmitter that is configured to transmit a response signal to the on-board device in response to the request signal, based on a reception of the request signal by the LF receiver and a measurement of the variation pattern by the measurement unit.

With the configurations according to the first, second, and third aspects of the present disclosure, the pattern determining section sequentially changes and determines the variation pattern of the measurement signal, so that the variation pattern of electromagnetic wave intensity of the measurement signal transmitted by the on-board device sequentially changes. Accordingly, even when a malicious third person analyzes the measurement signal and acquires a variation pattern of the measurement signal at a certain time point, when a new measurement signal with a different variation pattern is generated, the electromagnetic wave intensity of the transmitted measurement signal has a different variation pattern from that analyzed by the malicious third person. Thus, the measurement signal after generated with a new variation pattern can no longer be reproduced with the variation pattern acquired by the malicious third person, so that the request signal including the measurement signal added thereto can hardly be reproduced with a repeater used in relay attacks.

The verifying section establishes verification based on the fact that the variation pattern of the transmitted measurement signal matches the variation pattern obtained by measurement of the measurement signal through the measurement unit. Therefore, when the measurement signal is not correctly reproduced because the request signal has been relayed via a repeater, the verification can be made to fail.

BRIEF DESCRIPTION OF DRAWINGS

The above and other objects, features and advantages of the present disclosure will become more apparent from the following detailed description made with reference to the accompanying drawings. In the drawings:

FIG. 11 is a diagram showing a transmission pattern TA determined at S1A of FIG. 10;

FIG. 12 is a diagram showing a transmission pattern TB determined at S1A of FIG. 10;

EMBODIMENTS

First Embodiment

Figure 1:
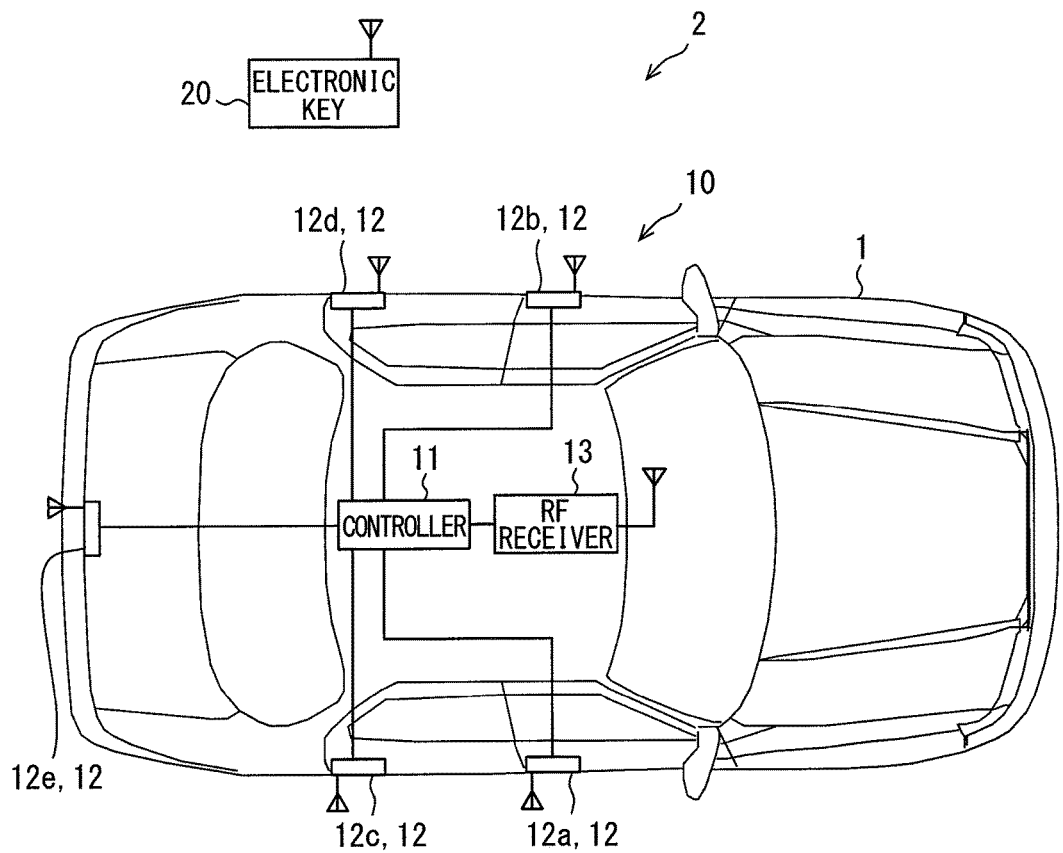
FIG. 1 is a diagram illustrating the relationship between an on-board device and an electronic key of an electronic key system according to a first embodiment of the present disclosure.

Hereinafter, an electronic key system 2 as a first embodiment of the present disclosure will be described with reference to the drawings. The relationship between an on-board device 10 mounted on a vehicle 1 and an electronic key 20 held by a user will be described with reference to FIG. 1.

The on-board device 10 has a wireless communication function and periodically transmits a request signal Srq including a measurement signal Si for intensity measurement with a sequentially varied variation pattern of electromagnetic wave intensity (hereinafter, radio wave intensity) from transmission antennas 124 (see FIG. 2) provided in several parts of the vehicle 1. The configuration of the on-board device 10 will be described later in detail.

The electronic key 20 is a portable device having a wireless communication function, and sends back a response signal Sre sequentially to the on-board device 10 when the electronic key 20 receives the request signal Srq transmitted from the on-board device 10. The response signal Sre includes a key ID that identifies the electronic key 20. The electronic key 20 also has a function of measuring the radio wave intensity, and determines the variation pattern of the radio wave intensity of the measurement signal Si contained in the received request signal Srq. The electronic key adds a signal indicative of the measured variation pattern of radio wave intensity of the measurement signal Si (hereinafter, measured pattern signal) to the response signal Sre. The measured pattern signal indicates how the radio wave intensity of the measurement signal Si has changed, as well as the radio wave intensity of each signal component constituting the measurement signal Si.

When the on-board device 10 receives the response signal Sre sent back from the electronic key 20, the on-board device 10 acquires the key ID and the measured pattern signal contained in the response signal Sre. Verification is achieved when the key ID acquired from the response signal Sre matches the key ID recorded in the on-board device 10, and also when the received signal strength pattern indicated by the measured pattern signal acquired from the response signal Sre matches the transmitted signal strength pattern.

Figure 4:
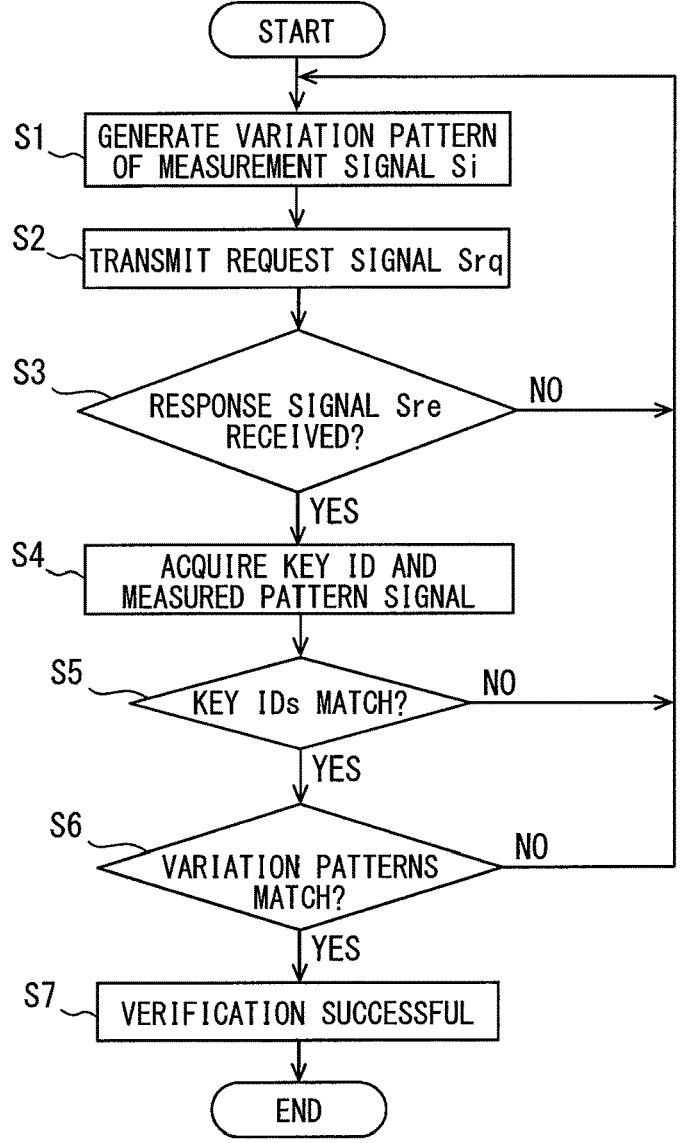
FIG. 4 is a flowchart showing the operation of a controller of the on-board device according to the first embodiment.

As shown in FIG. 1, the on-board device 10 is configured to include a controller 11, LF transmitters 12a, 12b, 12c, 12d, and 12e, and an RF receiver 13. The controller 11 is configured mainly by a microcomputer made up of a CPU, ROM, RAM, and so on. The process steps shown in FIG. 4 are carried out by the CPU executing a program stored in a non-transitory tangible storage medium such as the ROM while also using the temporary storage function of the RAM. A process corresponding to the program is carried out when the CPU executes the program. Some or all of the functions executed by the controller 11 may be configured by hardware such as one or more ICs or the like.

The LF transmitters 12a, 12b, 12c, 12d, and 12e are all configured in the same manner. The LF transmitters 12a, 12b, 12c, 12d, and 12e will be referred to as LF transmitter 12 when need not be distinguished from each other. The LF transmitter 12a is provided inside the door handle of the right front door of the vehicle 1. The LF transmitter 12b is provided inside the door handle of the left front door of the vehicle 1. The LF transmitter 12c is provided inside the door handle of the right rear door of the vehicle 1. The LF transmitter 12d is provided inside the door handle of the left rear door of the vehicle 1. The LF transmitter 12e is provided on a rear end face of the vehicle 1.

Figure 2:
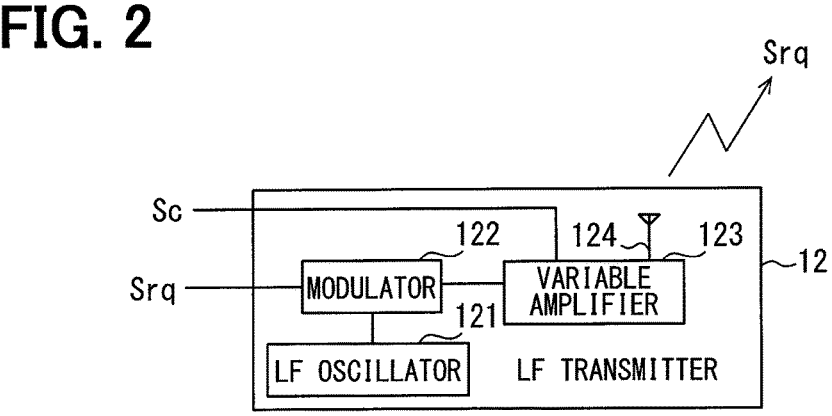
FIG. 2 is a block diagram illustrating a configuration of an LF transmitter in FIG. 1.

The LF transmitter 12 includes, as shown in FIG. 2, an LF oscillator 121, a modulator 122, a variable amplifier 123, and a transmission antenna 124. The LF oscillator 121 generates a signal of a frequency in the LF band, e.g., 135 kHz. In the present embodiment, the LF band refers to low frequency or very low frequency bands.

Signals generated by the LF oscillator 121, and request signals Srq generated by the controller 11 are sequentially input to the modulator 122. The modulator 122 digitally modulates the request signal Srq with a predetermined modulation scheme such as FSK or ASK, and superposes the digitally modulated signal on a carrier wave that is the signal generated by the LF oscillator 121. The signal superposed on the carrier wave is input to the variable amplifier 123.

The signal modulated by the modulator 122 and a gain indicator signal Sc are input to the variable amplifier 123. The gain indicator signal Sc is a signal determined and output by the controller 11. The variable amplifier 123 is an amplifier that can change the gain. The variable amplifier 123 amplifies the signal modulated by the modulator 122 with a gain in accordance with the gain indicator signal Sc, and outputs the amplified signal to the transmission antenna 124. When the signal amplified by the variable amplifier 123 is supplied to the transmission antenna 124, the amplified signal is transmitted as a radio wave.

Referring back to FIG. 1, the RF receiver 13 receives and demodulates the response signal Sre sent back from the electronic key 20. The RF receiver 13 is equivalent to an "on-board device receiver".

Figure 3:
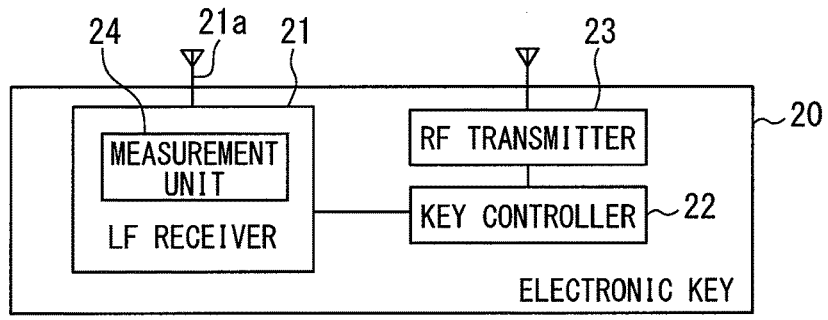
FIG. 3 is a configuration diagram of the electronic key of the electronic key system.

Next, the configuration of the electronic key 20 will be described with reference to FIG. 3. The electronic key 20 is configured to include an LF receiver 21, a key controller 22, and an RF transmitter 23.

The LF receiver 21 receives and demodulates the request signal Srq transmitted by the on-board device 10. The LF receiver 21 also includes a measurement unit 24. The measurement unit 24 is an RSSI circuit that measures the received signal strength, and the measurement unit 24 measures the strength pattern of the measurement signal Si contained in the request signal Srq received by an LF antenna 21a.

The key controller 22 is mainly configured by a microcomputer made up of a CPU, ROM, RAM, and so on. The CPU executes a program stored in a non-transitory tangible storage medium such as the ROM while also using the temporary storage function of the RAM. The key controller 22 thus carries out the process steps shown in FIG. 6. A process corresponding to the program is carried out when the CPU executes the program. Some or all of the functions executed by the key controller 22 may be configured by hardware such as one or more ICs or the like.

The RF transmitter 23 demodulates and transmits the response signal Sre generated by the key controller 22. The frequency used for transmission is 315 MHz in the present embodiment. Other frequencies than 315 MHz in the range of 300 MHz to 3 GHz band may also be used. The RF transmitter 23 is equivalent to a "key transmitter".

Next, the operation of the controller 11 of the on-board device 10 will be described with reference to the flowchart of FIG. 4. The controller 11 periodically carries out the process steps shown in FIG. 4 in a state where conditions for periodically transmitting the request signal Srq to the outside of the vehicle are satisfied, such as when the ignition switch is off. Each step of the process is carried out starting from step S1 of the flowchart (hereinafter, the word "step" shall be omitted).

At S1, a variation pattern of radio wave intensity of the measurement signal Si is generated, and the generated variation pattern is stored in a memory of the controller 11. When a variation pattern has already been stored in the memory, the stored variation pattern is overwritten to the newly generated variation pattern. The variation pattern may be generated by selecting one from a plurality of predetermined patterns every time S1 is carried out, or, by using a random number generator every time S1 is carried out. This process step S1 is equivalent to a "pattern determining section".

At S2, the request signal Srq is generated by adding the measurement signal Si generated at S1 to the information signal Sd. The generated request signal Srq is output sequentially to the modulators 122 of all the LF transmitters 12a, 12b, 12c, 12d, and 12e. Thus, the request signal Srq is transmitted sequentially from all of the LF transmitters 12a, 12b, 12c, 12d, and 12e. This process step S2 is equivalent to a "request signal generating section".

The request signal Srq in the present embodiment will be described with reference to FIG. 5. A request signal Srq1 and a request signal Srq2 are both signals including the measurement signal Si added to the information signal Sd. The information signal Sd is a signal that contains information, such as a wake-up signal or verification signal. A measurement signal Si, on the other hand, is a signal for measuring radio wave intensity and its signal contents bear no meaning.

Figure 5:
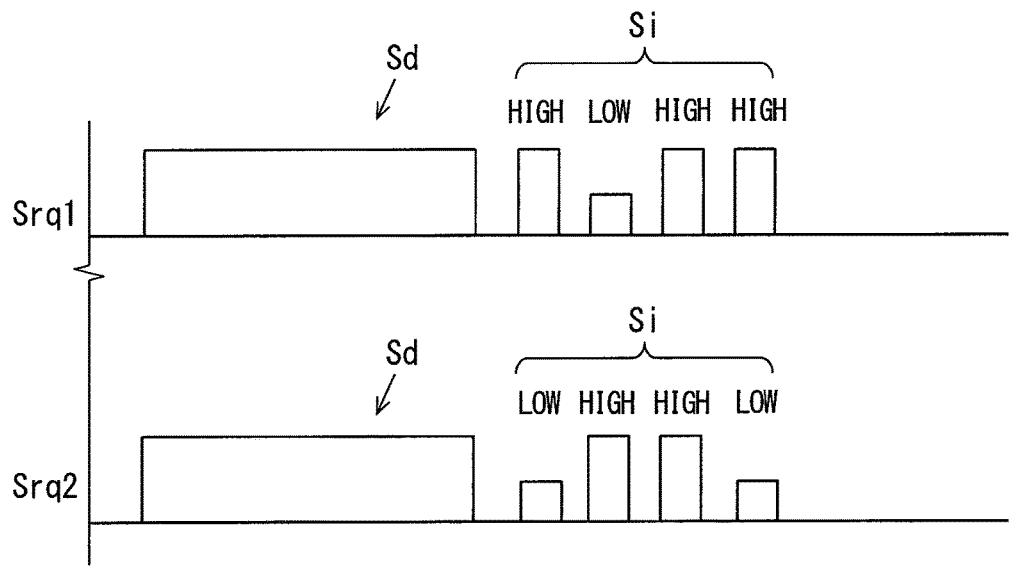
FIG. 5 is a diagram showing request signals Srq transmitted by the on-board device according to the first embodiment.

As shown in FIG. 5, in the present embodiment, the measurement signal Si is made up of four blocks represented by two levels of intensity. The radio wave intensity of the measurement signal Si contained in the request signal Srq1 changes with a high-low-high-high pattern. The radio wave intensity of the measurement signal Si contained in the request signal Srq2 changes with a low-high-high-low pattern. In the present embodiment, high and low levels of the measurement signal Si are obtained by transmitting the signal with a transmission power such that the ratio of the high-intensity blocks to the low-intensity blocks of the radio waves are 2:1.

At S2, in addition to outputting the request signal Srq to the modulator 122 of the LF transmitter 12, gain is determined for each measurement signal component Si based on the radio wave intensity of the measurement signal Si, and a gain indicator signal Sc indicating the gain is output to the variable amplifier 123. Thus, the transmission power of the measurement signal Si is varied with the variation pattern determined at S1.

At S3, it is determined whether the response signal Sre sent back from the electronic key 20 has been received. For example, when a response signal Sre is received within about several hundred msec, for example, after the transmission of the request signal Srq, it may be determined that the response signal Sre has been received. When it is determined that the response signal Sre has been received, the process goes to S4. When it is determined that the response signal has not been received, the process goes back to S1.

The response signal Sre contains the key ID of the electronic key 20 that has sent the response signal Sre, and a measured pattern signal that is a signal indicative of the variation pattern of the radio wave intensity of the measurement signal Si. At S4, the key ID and measured pattern signal contained in the response signal Sre are acquired.

At S5, it is determined whether the key ID acquired at S4 matches the key ID, which is preliminarily stored in the controller 11. When it is determined that they match, the process goes to S6. When it is determined that they do not match, the process goes back to S1.

At S6, it is determined whether the variation pattern indicated by the measured pattern signal acquired at S4 matches the variation pattern stored in the memory at S1. This process step S6 and the next S7 are equivalent to a "verifying section". In the present embodiment, for example, taking the block having a lowest radio wave intensity of measured signal components as 1, blocks of 1.5 or more are regarded as high, and blocks of less than 1.5 are regarded as low, and the high-low variation pattern is compared with the variation pattern generated at S1. When it is determined that the variation patterns match, the process goes to S7. When it is determined that they do not match, the process goes back to S1.

At S7, it is determined that verification has been successful, and this information is transmitted to a predetermined unit such as a door lock ECU, whereupon the process of the flowchart is ended.

Next, the operation of the key controller 22 of the electronic key 20 will be described with reference to the flowchart of FIG. 6. The key controller 22 periodically carries out each of the process steps of the flowchart starting from S11 when the power is on.

At S11, it determines whether the request signal Srq transmitted by the on-board device 10 has been received. When it is determined that the request signal Srq has been received, the process goes to S2. When it is determined that the request signal Srq has not been received, the process goes back to S1.

At S12, the measurement result of radio wave intensity of the measurement signal Si contained in the request signal Srq measured by the measurement unit 24 is obtained. In the present embodiment, the measurement unit 24 measures the intensity of radio waves received by the LF receiver 21 without distinguishing the measurement signal Si from other signals. At S12, the radio wave intensity measured by the measurement unit 24 is acquired, and the radio wave intensity of the measurement signal Si part is extracted from the acquired radio wave intensity. Which part of the acquired radio wave intensity is the radio wave intensity of the measurement signal Si is preliminarily determined, for example, by assigning a portion after the end of the information signal Sd for a certain time period as the part representing the radio wave intensity of the measurement signal Si.

At S13, a measured pattern signal is generated based on the results obtained at S12, and is added to the response signal Sre, which is then transmitted via the RF transmitter 23, whereupon the process of the flowchart is ended.

According to the first embodiment described above, every time the controller 11 carries out S1, a different variation pattern is generated. Therefore, the radio wave intensity of the measurement signal Si transmitted by the on-board device 10 changes with a different variation pattern every time S1 is carried out. Accordingly, even when a third person with a malicious intension analyzes the measurement signal Si and acquires its variation pattern at a certain time point, when S1 is carried out, the radio wave intensity of the transmitted measurement signal Si has a different variation pattern from that acquired by the malicious third person.

Therefore, the variation pattern acquired by the malicious third person cannot reproduce the variation pattern of the measurement signal Si transmitted after the process of S1 thereafter. According to the present embodiment, in this way, the request signal Srq transmitted by the on-board device 10 can hardly be reproduced with a repeater used in relay attacks.

In the present embodiment, the on-board device 10 stores the variation pattern generated at S1, and compares the stored variation pattern with the variation pattern represented by the measured pattern signal contained in the received response signal Sre. This allows the on-board device 10 to realize that a relay attack has been performed by detecting a failure to correctly reproduce the electromagnetic wave intensity pattern of the measurement signal Si because of the request signal Srq having been transmitted via a repeater.

Second Embodiment

Next, a second embodiment will be described. In the description of the second and the following embodiments, the elements given the same reference numerals as those used previously are the same elements as those with the same reference numerals in previous embodiments, unless otherwise stated. When only a part of a configuration is described, previously described embodiments can be applied to the other parts of the configuration.

In the first embodiment, the variation pattern of the measurement signal Si is determined by the on-board device 10. In the second embodiment, the variation pattern of the measurement signal Si is determined by the electronic key 20.

The operation of the key controller 22 of the electronic key 20 in the second embodiment will be described with reference to the flowchart of FIG. 7. In the second embodiment, the key controller 22 periodically carries out the process steps shown in FIG. 7 instead of the process steps shown in FIG. 6.

At S21, it is determined whether a request signal Srq that does not contain a measurement signal Si and is transmitted by the on-board device 10 has been received. More specifically, the request signal Srq without the measurement signal Si is a wake-up signal that instructs the electronic key 20 to wake up. When it is determined that the wake-up signal has been received, the process goes to S22. When it is determined that the wake-up signal has not been received, the process goes back to S21.

At S22, a variation pattern of radio wave intensity of the measurement signal Si is determined, and the determined variation pattern is stored in a memory of the key controller 22. The variation pattern is determined, in the present embodiment, by selecting one of a plurality of variation patterns each assigned a different number, a list of which is shared in advance by the on-board device 10 and the key controller, every time S22 is performed. This S22 is equivalent to a "change signal generating section".

At S23, a response signal Sre containing a pattern indicator signal, which indicates the number of the variation pattern selected at S22. This response signal Sre contains an ACK signal in addition to the pattern indicator signal. This S23 is equivalent to a "response signal generating section".

At S24, it is determined whether the request signal Srq that contains the measurement signal Si and is transmitted by the on-board device 10 has been received. The request signal Srq is a signal containing a challenge signal, which is a signal for verification, in addition to the measurement signal Si. When it is determined that the request signal Srq has been received, the process goes to S25. When it is determined that the request signal has not been received, the process goes back to S21.

S25 is the same process step as S12, wherein the measurement result of radio wave intensity of the measurement signal Si contained in the request signal Srq measured by the measurement unit 24 is obtained.

At S26, it is determined whether the variation pattern of the radio wave intensity of the measurement signal Si indicated by the results obtained at S25 matches the variation pattern stored in the memory at S22. S26 is equivalent to an "electronic key determining section".

The variation patterns may be compared in a similar manner as that of the comparison of variation patterns in the first embodiment. When it is determined that the variation patterns match, the process goes to S27. When it is determined that they do not match, the process goes back to S21.

At S27, the response signal Sre containing the key ID is transmitted to the on-board device 10, whereupon the process of the flowchart is ended.

Figure 8:
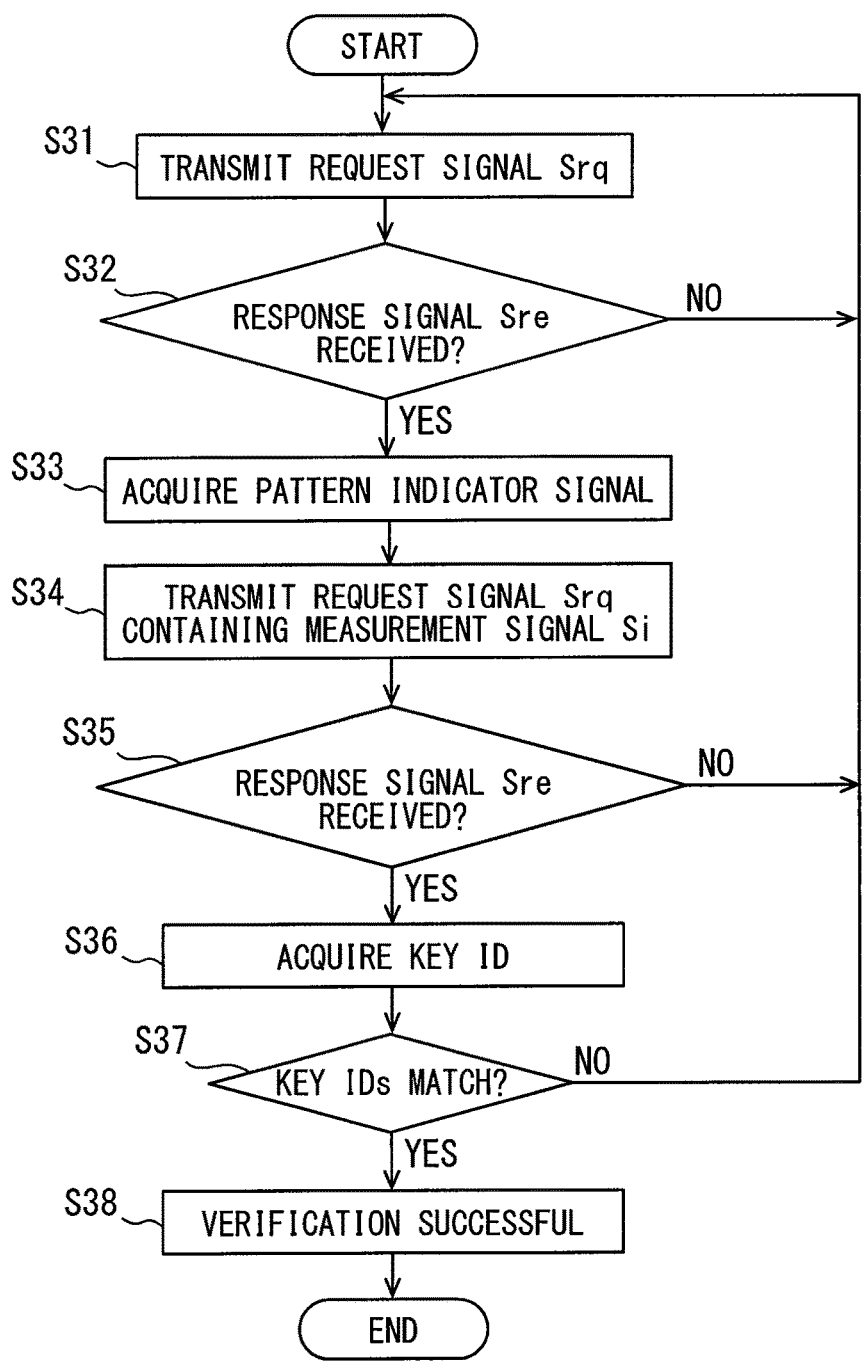
FIG. 8 is a flowchart showing the operation of the controller according to the second embodiment.

The operation of the controller 11 of the on-board device 10 will be described with reference to the flowchart of FIG. 8. In the second embodiment, the controller 11 periodically carries out the process steps shown in FIG. 8 instead of the process steps shown in FIG. 4.

At S31, a request signal Srq that does not contain the measurement signal Si is transmitted via the LF transmitter 12. More specifically, the request signal Srq is the wake-up signal mentioned above. When the electronic key 20 receives the request signal Srq, the electronic key 20 performs S22 and S23 described above, and transmits a response signal Sre containing a pattern indicator signal.

At S32, it is determined whether the response signal Sre sent back from the electronic key 20 and containing the pattern indicator signal has been received. When it is determined that the response signal Sre has been received, the process goes to S33. When it is determined that the response signal has not been received, the process goes back to S31.

At S33, the pattern indicator signal contained in the response signal Sre is acquired. At S34, a request signal Srq containing the measurement signal Si is transmitted, while a gain indicator signal Sc is transmitted to the variable amplifier 123 such that the radio wave intensity of the measurement signal Si changes in accordance with the variation pattern as indicated by the pattern indicator signal obtained at S33. When the electronic key 20 receives the request signal Srq, the electronic key 20 performs S25 and S26. When the determination at S26 is yes, the electronic key 20 transmits the response signal Sre.

At S35, it is determined whether the response signal Sre sent back from the electronic key 20 has been received. When it is determined that the response signal Sre has been received, the process goes to S36. When it is determined that the response signal Sre has not been received, the process goes back to S31.

At S36, the key ID contained in the response signal Sre is acquired. At S37, it is determined whether the key ID acquired at S36 matches the key ID, which is preliminarily stored in the controller 11. When it is determined that they match, the process goes to S38. When it is determined that they do not match, the process goes back to S31.

The process of S38 is the same as that of S7, wherein it is determined that verification has been successful, and this information is transmitted to a predetermined unit, whereupon the process of the flowchart is ended. In the second embodiment, unlike the first embodiment, the controller 11 of the on-board device 10 determines that verification has been successful when the key IDs match, and does not determine whether variation patterns match. This is because, in the second embodiment, the key controller 22 transmits the response signal Sre on condition that the variation patterns are determined that they match at S26. Namely, in the second embodiment, it has already been determined by the key controller 22 that the variation patterns match.

According to the second embodiment described above, every time the key controller 22 carries out the process of S22, the key controller 22 transmits a pattern indicator signal that indicates a different variation pattern to the on-board device 10 by adding the pattern indicator signal to the response signal Sre. The on-board device 10 transmits the measurement signal Si with the variation pattern of radio wave in accordance with the pattern indicator signal contained in the response signal Sre. Therefore, every time the key controller 22 carries out the process of S22, the variation pattern of the radio wave intensity of the measurement signal Si transmitted by the on-board device 10 changes. Accordingly, similarly to the first embodiment, the request signal Srq transmitted by the on-board device 10 can hardly be reproduced with a repeater used in relay attacks.

Third Embodiment

Next, a third embodiment will be described. In the first and second embodiments, a variation pattern of radio wave intensity of the measurement signal Si received by the electronic key 20 is generated by varying the transmission power of signal components that form the measurement signal Si in one LF transmitter 12. In the third embodiment, the variation pattern is determined by selecting one or more of LF transmitters 12, which is configured to transmit respective signal components to together form the measurement signal Si from the plurality of LF transmitters 12.

Figure 9:
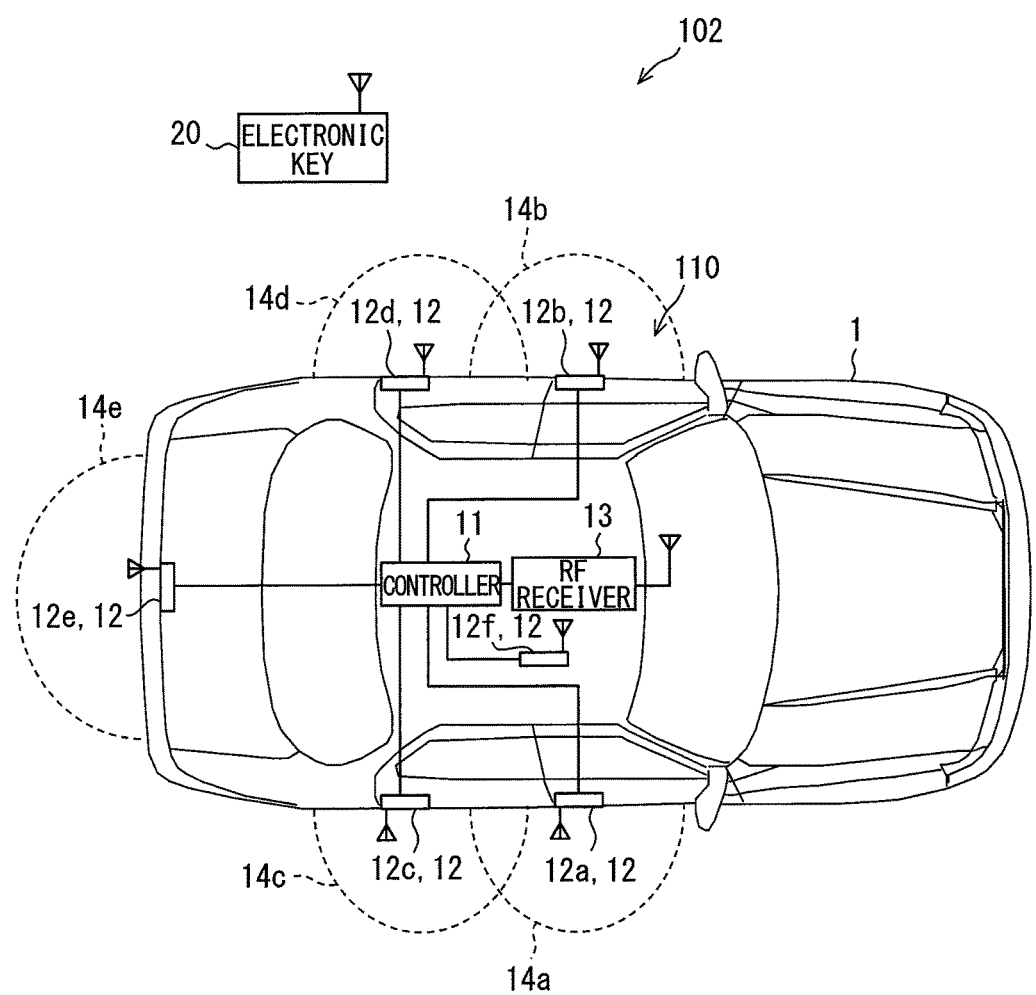
FIG. 9 is a diagram illustrating the relationship between an on-board device and an electronic key of an electronic key system according to a third embodiment.

The configuration of the third embodiment will be described with reference to FIG. 9. The electronic key system 102 of the third embodiment includes an on-board device 110 as shown in FIG. 9. The on-board device 110 includes an LF transmitter 12f in addition to the LF transmitters 12a, 12b, 12c, 12d, and 12e shown in FIG. 1. The LF transmitter 12f is configured in the same manner as the other LF transmitters 12a, 12b, 12c, 12d, and 12e, and is disposed near the center inside the vehicle.

Figure 10:
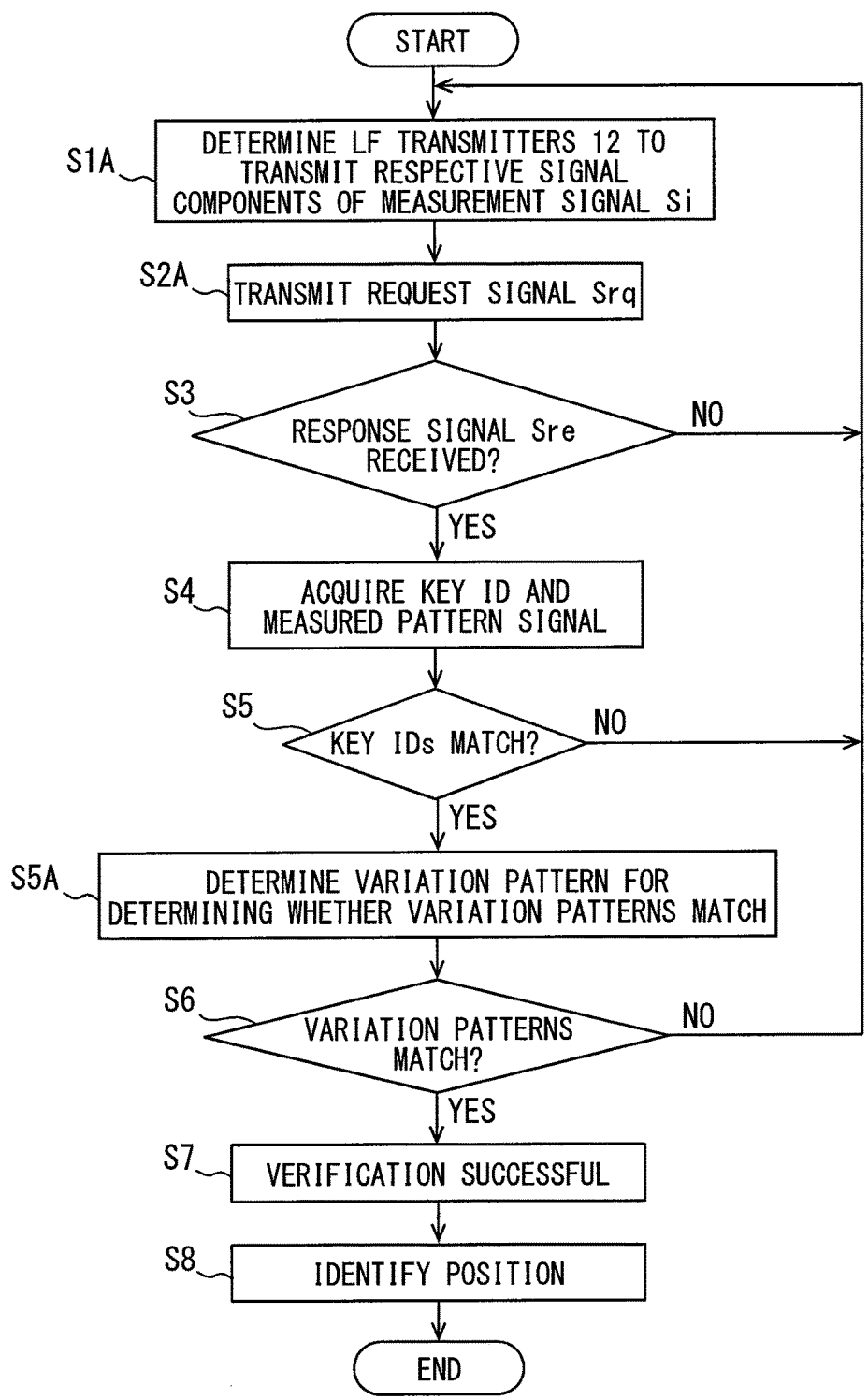
FIG. 10 is a flowchart showing process steps executed by the controller of the on-board device in the third embodiment.

In the third embodiment, the controller 11 carries out the process steps shown in FIG. 10 instead of the process steps shown in FIG. 4. At S1A, one or more of LF transmitters 12, which is configured to transmit respective signal components to together form the measurement signal Si, is determined, and the one or more of LF transmitters 12, which is configured to transmit the LF transmitters' respective signal components are stored in the memory.

FIGS. 11 and 12 are tables showing examples of the contents determined at S1A, wherein the LF transmitters 12 that are to transmit the information signal Sd are each assigned to transmit each of the measurement signal components Si1 to Si4. These tables are stored in a predetermined storage unit such as a memory in the controller 11 in advance.

FIG. 11 shows a transmission pattern TA, and FIG. 12 shows a transmission pattern TB. While the LF transmitters 12 respectively transmit the first, second, third, and fourth measurement signal components Si1, Sit, Si3, and Si4 in FIG. 11, they respectively transmit the second, third, fourth, and first measurement signal components Sit, Si3, Si4, and Si1 in FIG. 12. Several other transmission patterns than those of FIGS. 11 and 12 are stored in advance in the present embodiment. At S1A, every time S1A step is carried out, one of these plurality of pre-stored transmission patterns is selected randomly. The order of the LF transmitters 12 to transmit the respective measurement signal components Si changes depending on the selected transmission pattern. Thus, by selecting the transmission pattern randomly, the order of the LF transmitters 12 to transmit the respective measurement signal components Si changes randomly. Therefore, even when the measurement signal Si is received at the same position around the vehicle 1, the variation pattern of radio wave intensity of the measurement signal Si varies in accordance with the selected transmission pattern. That is, the variation pattern of the electromagnetic wave intensity of the measurement signal Si is varied at S1A. Thus, S1A is equivalent to a "pattern determining section".

When the electronic key 20 receives the request signal Srq containing the information signal Sd, the electronic key 20 transmits the response signal Sre containing the measured pattern signal. Reception areas 14a, 14b, 14c, 14d, and 14e where the request signal Srq can be received are small, substantially semicircular areas each defined around each LF transmitter 12 transmitting the information signal Sd, as shown in FIG. 9.

Therefore, the radio wave intensity of the measurement signal component Si transmitted by the LF transmitter 12 that has transmitted the information signal Sd is the highest of all the radio wave intensities of the measurement signal components Si that the electronic key 20 receives. For example, when the transmission pattern TA is selected, the radio wave intensity of the measurement signal component Si1 is the highest of all the radio wave intensities of the measurement signal components Si that the electronic key 20 receives. On the other hand, when the transmission pattern TB is selected, the radio wave intensity of the measurement signal component Sit is the highest of all the radio wave intensities of the measurement signal components Si that the electronic key 20 receives. Namely, when the transmission patterns TA and TB are selected, the measurement signals Si received by the electronic key 20 have variation patterns of radio wave intensity respectively shown in FIG. 13. In the variation patterns of FIG. 13, the measurement signal components Si having radio wave intensities that are the second highest and lower than that are handled as having the same radio wave intensity.

At S2A, a request signal Srq containing the information signal Sd and measurement signal Si is generated, and is transmitted with the transmission pattern determined at S1A. This S2A is equivalent to a "request signal generating section".

The LF transmitters 12a, 12b, 12c, 12d, 12e, and 12f each transmit the measurement signal component Si with a higher transmission power than that when they transmit the information signal Sd. Each LF transmitter 12 transmits the measurement signal component Si with a transmission power of such a level that, for example, the transmission area of the information signal Sd transmitted by the LF transmitter 12c can be covered by the area of the measurement signal component Si transmitted by the adjacent LF transmitter 12a. Each LF transmitter 12 transmits the measurement signal component Si with the same transmission power, and the power does not change at any time point of transmission.

The transmission power is made higher than that when transmitting the information signal Sd. This is because the electronic key 20 should preferably receive the measurement signal components Si sent from a plurality of LF transmitters 12, whereas the electronic key 20 only needs to receive the information signal Sd sent from one of the LF transmitters 12.

Since the LF transmitters 12 each transmit the measurement signal Si with a higher transmission power than that when sending the information signal Sd, when the electronic key 20 is at a position where the electronic key 20 can receive the information signal Sd, it is highly likely that the electronic key 20 can also receive the measurement signal Si transmitted from each of the LF transmitters 12.

The distance from each LF transmitter 12 to the electronic key 20 varies depending on the position of each LF transmitter 12, so that the attenuation rates of radio waves of the measurement signal components Si1 to Si4 received by the electronic key 20 are different from each other. Therefore, the radio wave intensities of the measurement signal components Si1 to Si4 received by the electronic key 20 are different from each other.

Figure 14:
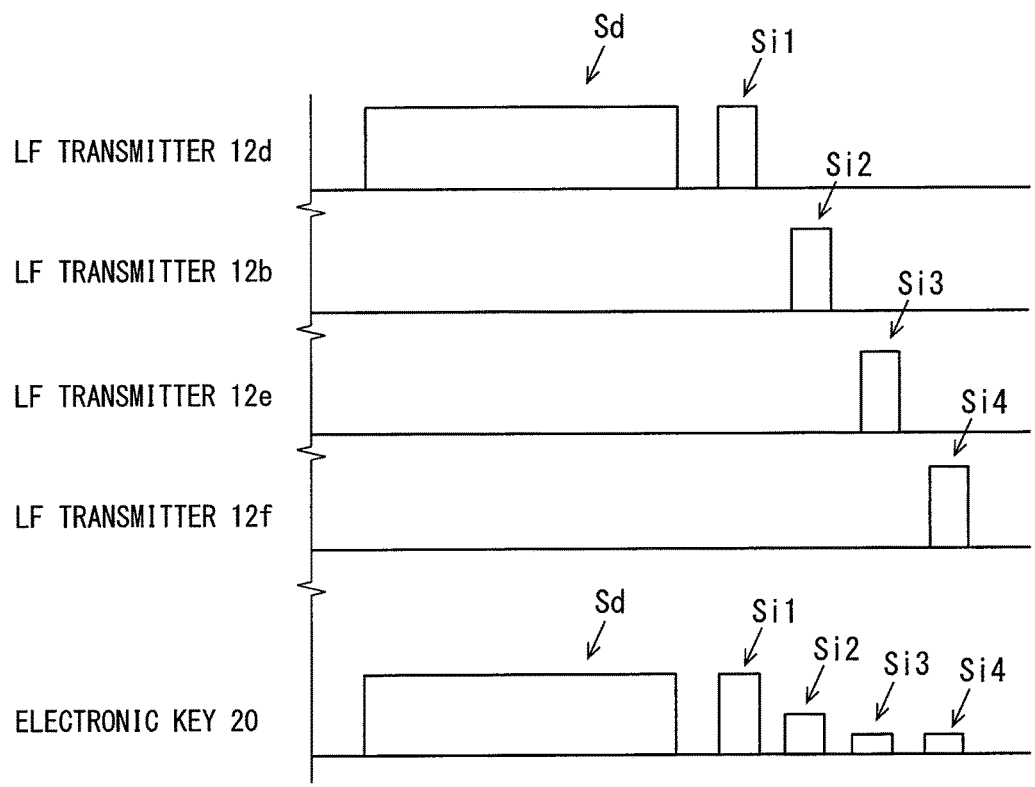
FIG. 14 is a diagram showing an information signal Sd and a measurement signal Si transmitted by the on-board device and an information signal Sd and a measurement signal Si received by the electronic key according to the third embodiment.

FIG. 14 exemplarily illustrates the radio wave intensities when the transmission pattern TA is selected and the electronic key 20 receives the request signal Srq, wherein the LF transmitter 12d is the one that transmits the information signal Sd, and the LF transmitters 12d, 12b, 12e, and 12f transmit the measurement signal components Si1 to Si4 respectively. FIG. 14 shows an example when the electronic key 20 is located near the left rear door of the vehicle 1 as shown in FIG. 1.

Since the electronic key 20 is positioned near the left rear door of the vehicle 1, the LF transmitter 12d is the closest to the electronic key 20. Therefore, the measurement signal component Si1 transmitted from the LF transmitter 12d has the highest radio wave intensity of all the measurement signal components Si1 to Si4 that the electronic key 20 receives. The measurement signal component Si2 transmitted successively is transmitted from the LF transmitter 12b. Since the LF transmitter 12b is farther from the electronic key 20 than the LF transmitter 12d, the measurement signal component Sit received by the electronic key 20 has a lower radio wave intensity than that of the measurement signal component Si1.

The measurement signal component Si3 is transmitted from the LF transmitter 12e disposed on the rear end face of the vehicle 1. The measurement signal component Si4 is transmitted from the LF transmitter 12f disposed inside the vehicle. These LF transmitters 12e and 12f are farther from the electronic key 20 than the LF transmitters 12d and 12b. Therefore, the measurement signal components Si3 and Si4 received by the electronic key 20 have a lower radio wave intensity than those of the measurement signal components Si1 and Sit. As seen from the above, the measurement signal components Si1 to Si4 received by the electronic key 20 have the radio wave intensities as illustrated in FIG. 14.

Figure 6:
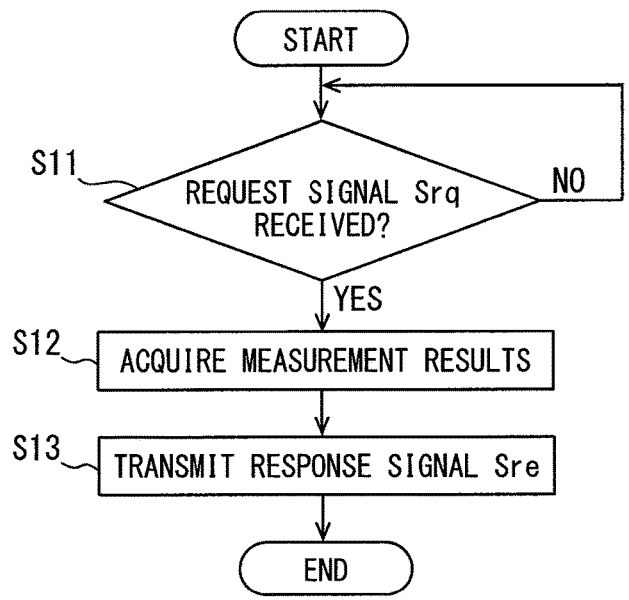
FIG. 6 is a flowchart showing the operation of a key controller of the electronic key according to the first embodiment.
Figure 7:
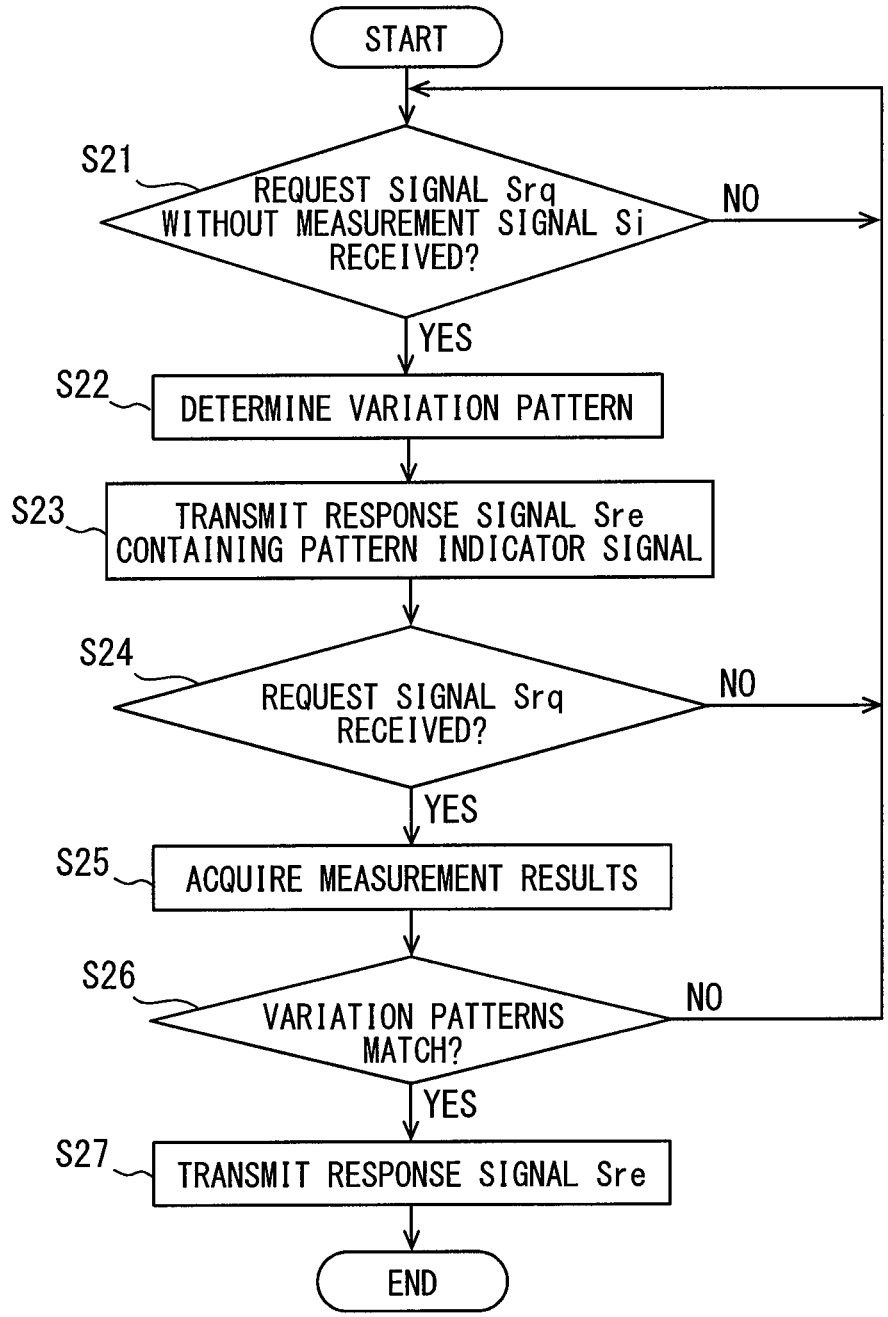
FIG. 7 is a flowchart showing the operation of the key controller according to a second embodiment.

The key controller 22 of the electronic key 20 carries out the process steps shown in FIG. 6 similarly to the first embodiment. The electronic key 20 thus transmits the response signal Sre containing the measured pattern signal to the on-board device 10.

Figure 13:
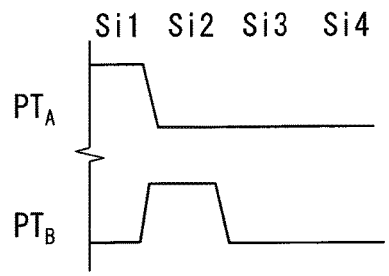
FIG. 13 is a diagram showing variation patterns PT corresponding to the transmission patterns TA and TB respectively.

When the RF receiver 13 of the on-board device 10 receives the response signal Sre, the determination at S3 in FIG. 10 is yes, so that S4 and S5 are carried out. Next, at S5A, a variation pattern to be used for determining whether it matches the variation pattern indicated by the measured pattern signal contained in the received response signal Sre is determined based on the transmission pattern. For example, when the transmission pattern is transmission pattern TA, the variation pattern $PT_A$ shown in FIG. 13 is determined as the variation pattern to be used for determining whether it matches the variation pattern indicated by the measured pattern signal.

Next, at S6, it is determined whether the variation pattern determined at S5A matches the variation pattern indicated by the measured pattern signal. As mentioned with reference to FIG. 13, the measurement signal components Si having radio wave intensities that are the second highest and lower than that are handled as having the same radio wave intensity in the variation pattern determined at S5A. Therefore, when the signal components with the highest radio wave intensities match, it is determined here that the variation patterns match.

When the determination at S6 is yes, the process goes to S7, and when no, back to S1. At S7, the same process at S7 in FIG. 4 is carried out. Next, at S8, the position of the electronic key 20 is identified based on the radio wave intensities of the measurement signal components Si received by the electronic key 20 and indicated by the measured pattern signal. The longer the distance between the LF transmitter 12 that has transmitted the measurement signal component Si and the electronic key 20, the lower the radio wave intensity of the measurement signal component Si that the electronic key 20 receives. Therefore, by having the relationship between the radio wave intensity and the distance stored in advance, the distance between the electronic key 20 and the LF transmitter 12 that has transmitted the measurement signal component Si can be calculated from the radio wave intensity of each measurement signal component Si received by the electronic key 20 and indicated by the measured pattern signal. When distances between three LF transmitters 12 and the electronic key 20 can be calculated, the position of the electronic key 20 can be identified from these three distances.

According to the third embodiment described above, every time the controller 11 transmits the request signal Srq, the transmission pattern, which determines which LF transmitters 12 shall transmit each of the signal components that form the measurement signal Si, is changed. Therefore, the variation pattern of the radio wave intensity when the electronic key 20 receives the measurement signal Si changes every time the request signal Srq is transmitted. Accordingly, similarly to the first embodiment, the request signal Srq transmitted by the on-board device 10 is hardly reproduced with the repeater that is used in relay attacks, and whether a relay attack has been performed can be determined by detecting a status where the request signal Srq is not correctly reproduced. In the third embodiment, the position of the electronic key 20 can also be identified based on the radio wave intensities of the measurement signal components Si received by the electronic key 20.

The embodiments of the present disclosure have been described above, but the present disclosure is not limited to the embodiments described above. The following modifications are also included in the technical scope of the present disclosure.

<First Modification>

In the second embodiment, when it is determined that the variation patterns do not match, the response signal Sre is not transmitted. Instead, not only when it is determined that the variation patterns match but also when they do not match, the response signal Sre may be transmitted such that it includes the results of determination that indicate whether the variation patterns match. In this case, the results of determination are added to the response signal Sre when it is generated at S27, and the generated response signal Sre is transmitted. S27 in a first modification is equivalent to a "determination results adding section".

<Second Modification>

When the electronic key 20 determines the variation pattern as in the second embodiment, the on-board device 10 may also determine whether the variation patterns match, as in the first embodiment. When the results of determination as to whether the variation patterns match can be obtained by the on-board device 10 as in a second modification, the first embodiment, or the first modification, an alert can be sent to a user's terminal such as a smart phone to inform the user of a relay attack attempt via a data communication device mounted on the vehicle 1.

<Third Modification>

In the first embodiment and second embodiment, the variation pattern is formed by two levels of intensity, high and low, but the variation pattern may be configured by three or more levels of intensity. The measurement signal Si shown as one example in the first embodiment and third embodiment is configured by four signal components, but the number of signal components forming the measurement signal Si may be other than four. The number of signal components that form the measurement signal Si may be changed every time the pattern is generated.

<Fourth Modification>

The variation pattern of the measurement signal Si is changed every time the request signal Srq is transmitted in the first embodiment, whereas it is changed every time the request signal Srq is received in the second embodiment. In the third embodiment, the variation pattern is changed every time the request signal Srq is transmitted. The timing at which the variation pattern is changed is not limited to these examples. For example, it may be changed every time the door is locked, or every time the engine is started. The pattern may be changed in response to a user's operation, such as an operation of a button on the electronic key 20.

<Fifth Modification>

In the third embodiment, the transmission power for the measurement signal Si is set higher than the transmission power for the information signal Sd, but the transmission power for the measurement signal Si may be set the same as the transmission power for the information signal Sd. The determination of whether the patterns match at S6 is still possible in that way.

<Sixth Modification>

In the third embodiment, whether the variation patterns match is determined based on whether the signal components with the highest radio wave intensity match. Instead, the signal components that form the measurement signal Si may be ranked in the order of its radio wave intensity, and whether the variation patterns match may be determined based on whether the ranks of the radio wave intensity completely match or not.

<Seventh Modification>

In the third embodiment, by randomly selecting one transmission pattern to be used from a plurality of predetermined transmission patterns, the order of transmission of the measurement signal components Si transmitted from the LF transmitters 12 is changed. The method of determining the order of transmission of the measurement signal components Si transmitted from the LF transmitters 12 is not limited to this. For example, by sequentially changing the transmission pattern in the predetermined order, the order of transmission of the measurement signal components Si transmitted from the LF transmitters 12 may be changed.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic key system comprising:
   an on-board device that is configured to be used in a vehicle; and
   an electronic key that is configured to communicate wirelessly with the on-board device,
   wherein the on-board device includes
      a pattern determining section configured to sequentially change and determine a variation pattern of electromagnetic wave intensity of a measurement signal, which is to be transmitted with a variation in the electromagnetic wave intensity,
      a request signal generating section configured to generate a request signal including the measurement signal added to the request signal, and
      at least one LF transmitter, which is configured to sequentially transmit the request signal generated by the request signal generating section to change the electromagnetic wave intensity of the measurement signal included in the request signal received by the electronic key according to the variation pattern as determined by the pattern determining section in response to the electronic key receiving the request signal;
   wherein the electronic key includes
      an LF receiver configured to receive the request signal,
      a measurement unit configured to sequentially measure the variation pattern of the electromagnetic wave intensity of the measurement signal included in the request signal received by the LF receiver, and
      a key transmitter configured to transmit a response signal to the on-board device according to the request signal, in response to a reception of the request signal by the LF receiver and a measurement of the variation pattern by the measurement unit; and
   wherein the on-board device further includes
      an on-board device receiver configured to receive the response signal, and
      a verifying section configured to establish verification of the electronic key, based on a reception of the response signal by the on-board device receiver and a determination based on the response signal in response to the variation pattern measured by the measurement unit matching the variation pattern determined by the pattern determining section,
   wherein the at least one transmitter includes a plurality of the LF transmitters at different positions in the vehicle,
   wherein one or more of the plurality of LF transmitters is selected to transmit an individual signal component, which has a predetermined transmission power, to be included in the variation pattern of the measurement signal as determined by the pattern determining section, and
   wherein the one or more of the plurality of LF transmitters is selected
      based on the electromagnetic wave intensity, which is indicated by the variation pattern determined through the pattern determining section, and
      based on an arrangement of the plurality of LF transmitters.

2. The electronic key system according to claim 1,
   wherein the key transmitter transmits the response signal with the variation pattern, which is measured by the measurement unit, added to the response signal, and
   wherein the verifying section establishes the verification of the electronic key, based on the reception of the response signal by the on-board device receiver and a determination that the variation pattern included in the response signal matches the variation pattern determined by the pattern determining section.

3. The electronic key system according to claim 1,
   wherein the electronic key further includes:
      a change signal generating section that is configured to generate a pattern indicator signal indicating the variation pattern to be changed, and
      a response signal generating section that is configured to generate the response signal including the pattern indicator signal added to the response signal, and
   wherein the request signal generating section of the on-board device that is configured to determine another variation pattern after the variation pattern is changed in accordance with the pattern indicator signal included in the response signal received by the on-board device receiver.

4. The electronic key system according to claim 3,
wherein the electronic key further includes an electronic key determining section is configured to determine whether the other variation pattern measured by the measurement unit matches the variation pattern indicated by the pattern indicator signal generated by the change signal generating section, and
wherein the key transmitter is configured to transmit the response signal in response to the electronic key determining section determining the other variation pattern of the electromagnetic wave intensity of the measurement signal matching the variation pattern indicated by the pattern indicator signal generated by the change signal generating section.

5. The electronic key system according to claim 3, wherein the electronic key further includes
an electronic key determining section that is configured to determine whether the other variation pattern measured by the measurement unit matches the variation pattern indicated by the pattern indicator signal generated by the change signal generating section, and
a determination results adding section that is configured to add a determination result of the electronic key determining section to the response signal, and
wherein the verifying section of the on-board device is configured to establish the verification of the electronic key, based on the determination results included in the response signal indicating a content in which the other variation pattern measured by the measurement unit matches the variation pattern indicated by the pattern indicator signal generated by the change signal generating section.

6. The electronic key system according to claim 1,
wherein the pattern determining section is configured to change the variation pattern every time the request signal is transmitted.

7. An on-board device configured to be used in a vehicle and to communicate wirelessly with an electronic key, the on-board device comprising:
a pattern determining section that is configured to sequentially change and determine a variation pattern of electromagnetic wave intensity of a measurement signal, which is to be transmitted with a variation in the electromagnetic wave intensity;
a request signal generating section that is configured to generate a request signal including the measurement signal added to the request signal;
at least one LF transmitter that is configured to sequentially transmit the request signal generated by the request signal generating section to change the electromagnetic wave intensity of the measurement signal included in the request signal received by the electronic key according to the variation pattern as determined by the pattern determining section in response to the electronic key communicating wirelessly with the on-board device to receive the request signal;
an on-board device receiver that is configured to receive a response signal transmitted by the electronic key, in response to the electronic key receiving the request signal and measuring the variation pattern of the electromagnetic wave intensity of the measurement signal included in the request signal; and
a verifying section that is configured to establish verification of the electronic key, based on a reception of the response signal by the on-board device receiver and a determination based on the response signal in response to the variation pattern measured by the electronic key matching the variation pattern determined by the pattern determining section,
wherein the at least one transmitter includes a plurality of the LF transmitters at different positions in the vehicle,
wherein one or more of the plurality of LF transmitters is selected to transmit an individual signal component, which has a predetermined transmission power, to be included in the variation pattern of the measurement signal as determined by the pattern determining section, and
wherein the one or more of the plurality of LF transmitters is selected
based on the electromagnetic wave intensity, which is indicated by the variation pattern determined through the pattern determining section, and
based on an arrangement of the plurality of LF transmitters.

8. An electronic key configured to communicate wirelessly with an on-board device used in a vehicle, the electronic key comprising:
an LF receiver that is configured to receive a request signal, which is transmitted by the on-board device, with a measurement signal for measurement of electromagnetic wave intensity;
a measurement unit that is configured to sequentially measure a variation pattern of the electromagnetic wave intensity of the measurement signal included in the request signal received by the LF receiver;
a key transmitter that is configured to transmit a response signal to the on-board device in response to the request signal, based on a reception of the request signal by the LF receiver and a measurement of the variation pattern by the measurement unit;
a change signal generating section that is configured to generate a pattern indicator signal, which instructs the on-board device to change and transmit the variation pattern of the electromagnetic wave intensity of a measurement signal; and
a response signal generating section that is configured to generate the response signal including the pattern indicator signal added to the response signal.

9. An electronic key system comprising:
an on-board device that is configured to be used in a vehicle; and
an electronic key that is configured to communicate wirelessly with the on-board device,
wherein the on-board device includes
a pattern determining section configured to sequentially change and determine a variation pattern of electromagnetic wave intensity of a measurement signal, which is to be transmitted with a variation in the electromagnetic wave intensity,
a request signal generating section configured to generate a request signal including the measurement signal added to the request signal, and
an LF transmitter, which is configured to sequentially transmit the request signal generated by the request signal generating section to change the electromagnetic wave intensity of the measurement signal included in the request signal received by the electronic key according to the variation pattern as determined by the pattern determining section in response to the electronic key receiving the request signal;
wherein the electronic key includes
an LF receiver configured to receive the request signal, a measurement unit configured to sequentially measure the variation pattern of the electromagnetic wave intensity of the measurement signal included in the request signal received by the LF receiver, and a key transmitter configured to transmit a response signal to the on-board device according to the request signal, in response to a reception of the request signal by the LF receiver and a measurement of the variation pattern by the measurement unit; and wherein the on-board device further includes an on-board device receiver configured to receive the response signal, and a verifying section configured to establish verification of the electronic key, based on a reception of the response signal by the on-board device receiver and a determination based on the response signal in response to the variation pattern measured by the measurement unit matching the variation pattern determined by the pattern determining section, and wherein the electronic key further includes:

a change signal generating section that is configured to generate a pattern indicator signal indicating the variation pattern to be changed, and a response signal generating section that is configured to generate the response signal including the pattern indicator signal added to the response signal, and wherein the request signal generating section of the on-board device is configured to determine another variation pattern after the variation pattern is changed in accordance with the pattern indicator signal included in the response signal received by the on-board device receiver.

10. The electronic key system according to claim 9, wherein the LF transmitter is configured to change transmission power of the measurement signal included in the request signal with the variation pattern as determined by the pattern determining section in response to transmitting the request signal.

11. The electronic key system according to claim 9, wherein the on-board device further includes a plurality of the LF transmitters at different positions in the vehicle, wherein one or more of the plurality of LF transmitters is selected to transmit an individual signal component, which has a predetermined transmission power, to be included in the variation pattern of the measurement signal as determined by the pattern determining section, and wherein the one or more of the plurality of LF transmitters is selected based on the electromagnetic wave intensity, which is indicated by the variation pattern determined through the pattern determining section, and based on an arrangement of the plurality of LF transmitters.

12. The electronic key system according to claim 9, wherein the electronic key further includes an electronic key determining section is configured to determine whether the other variation pattern measured by the measurement unit matches the variation pattern indicated by the pattern indicator signal generated by the change signal generating section, and wherein the key transmitter is configured to transmit the response signal in response to the electronic key determining section determining the other variation pattern of the electromagnetic wave intensity of the measurement signal matching the variation pattern indicated by the pattern indicator signal generated by the change signal generating section.

13. The electronic key system according to claim 9, wherein the electronic key further includes an electronic key determining section that is configured to determine whether the other variation pattern measured by the measurement unit matches the variation pattern indicated by the pattern indicator signal generated by the change signal generating section, and a determination results adding section that is configured to add a determination result of the electronic key determining section to the response signal, and wherein the verifying section of the on-board device is configured to establish the verification of the electronic key, based on the determination results included in the response signal indicating a content in which the other variation pattern measured by the measurement unit matches the variation pattern indicated by the pattern indicator signal generated by the change signal generating section.

* * * * *